Patented Dec. 25, 1945

2,391,508

UNITED STATES PATENT OFFICE 2,391,508

MANUFACTURE OF BUTADIENE

Herman Pines and Vladimir N. Ipatieff, Riverside, Ill., assignors to Universal Oil Products Company, Chicago, Ill., a corporation of Delaware No Drawing. Application March 31, 1943,
Serial No. 481,264

5 Claims. (Cl. 260—681)

The present invention is concerned with a process for the manufacture of butadiene and enables the production of this compound from the butanes and butenes produced incidental to the cracking of petroleum fractions for the manufacture of gasoline. The process also makes possible the utilization of the normal butane produced, incidental to the production of petroleum and that produced in connection with its primary distillation.

Since the present invention consists of a process for the manufacture of butadiene it is related to the problem of producing synthetic rubber from relatively cheap and readily available organic materials. The production of rubber substitutes by polymerizing butadiene or by copolymerizing it with other unsaturated compounds such as styrene and acrylonitrile is established and the present process, therefore, makes possible the production of a base material for use in these synthetic rubber processes.

In a broad aspect the present invention comprises a process for the manufacture of butadiene which consists in converting a butanediol to a butanediol di-alkanoate and then decomposing the resulting di-alkanoate into butadiene and an alkanoic acid by contacting it with a copper phosphate catalyst.

In one specific embodiment the present invention comprises a process for the manufacture of butadiene which consists in converting a butanediol to a butanediol diacetate and then decomposing the resulting diacetate into butadiene and acetic acid by contacting it with a copper phosphate catalyst.

In a further specific embodiment the invention comprises contacting the diacetate at a temperature of from about 200° to about 550° C. with a composite catalyst consisting essentially of a copper phosphate and a support such as kieselguhr.

Butanediols for conversion to butadiene by the present process can be prepared by treatment of butene-2 with hypochlorous acid to produce the corresponding chlorohydrin, subjecting the chlorohydrin to the action of potassium hydroxide to obtain the alkene oxide and hydrating the latter with a dilute solution of a strong acid such as sulfuric acid or perchloric acid. The diols are readily converted to alkanoates by reacting them with acids or acid anhydrides such as acetic acid or acetic anhydride, these reactions occurring readily even in the absence of catalysts.

In regard to the source of butene-2 this compound may be produced from normal butane by thermal decomposition or by dehydrogenation using certain types of catalysts. One type of catalyst useful in such dehydrogenation reactions consists of alumina or other relatively inert refractory carrying material composited with compounds and preferably oxides of elements selected from those in the left-hand columns of groups IV, V and VI of the periodic table. The temperatures used in such catalytic dehydrogenations range from about 900° to about 1200° F. in continuous operation while pressures only moderately above atmospheric are used, these pressures seldom being in excess of 100 pounds per square inch.

In accordance with the present invention a butanediol diacetate is decomposed to form butadiene and acetic acid by subjecting it at temperatures within the range of from about 200° to about 550° C. to contact with a copper phosphate catalyst. Under these conditions and the catalytic influence of the copper phosphate, the diacetate decomposes to form butadiene and acetic acid according to the following equation:

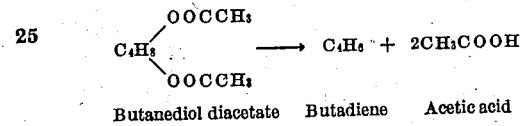

Butanediol diacetate   Butadiene   Acetic acid

By the use of the preferred catalysts in the present process the decomposition of a butanediol acetate can be brought about at considerably reduced temperatures than those necessary when catalysts are not employed. At the lower temperatures and in the presence of the preferred catalysts the desired butadiene is produced in higher yield and with greater selectivity. There is no formation of any substantial amount of acetic anhydride although minor quantities of carbon dioxide and acetone may be formed.

Catalysts which can be used in the present process may consist essentially either of copper orthophosphate or copper pyrophosphate or varying composites made by combining and interacting various proportions of copper oxides and phosphoric acids. Of particular value are catalysts consisting of copper phosphates and relatively inactive refractory supporting materials such as kieselguhr. These supported or spaced catalysts may be made by dissolving a copper phosphate in nitric acid, mixing the solution with a powdered spacing material and evaporating to drive off water and nitric acid. Alternatively, a copper phosphate may be mixed with a support in a finely divided condition and the mixture pelleted or otherwise formed to produce catalyst particles.

The present process is preferably conducted in a continuous manner by passing the vapors of a diacetate over a granular catalyst in a stationary bed at a rate corresponding to the formation of maximum yields of butadiene which is readily separated from acetic acid due to the wide difference in their boiling points. The recovered acetic acid can then be utilized for the further production of butanediol diacetate.

The preceding general description of the process and the reactions involved therein has been given in connection with a diacetate formed by interacting a butanediol with acetic anhydride. However, in place of acetic anhydride, corresponding anhydrides of other monobasic carboxylic acids can be used alternatively. The conditions employed in connection with these other acids both in the manufacture of the butanediol acid addition products and in the decomposition of these products in contact with the preferred catalysts will vary with each acid used. The use of acetic anhydride is generally preferable on account of its greater availability and lower cost.

The present process may be successfully carried out at temperatures varying from about 200° to about 550° C. and atmospheric or mildly superatmospheric pressures. The preferred method of operation is to pass the diacetate over a bed of granular catalyst at rates determined by the activity of the catalyst.

While butadiene may be readily manufactured in accordance with the present process by decomposing a butanediol diacetate in the presence of the preferred catalysts, decomposition of compounds with other mono-carboxylic acids may also be practiced in the presence of the same catalyst with varying degrees of effectiveness. Thus, a butanediol dipropionate or a butanediol dibutyrate as well as similar compounds of higher molecular weight acids of this series may be employed.

The following example is given of the production of butadiene in accordance with the present process using specific catalysts, but it is not intended to have the effect of correspondingly circumscribing the scope of the invention.

The supported copper phosphate catalyst was prepared as follows: 150 grams of

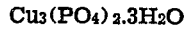

$Cu_3(PO_4)_2 \cdot 3H_2O$ was dissolved in an acid solution consisting of 135 cc. of 70 percent nitric acid and 360 cc. of distilled water. This solution was mixed with 150 g. of powdered kieselguhr making a thin paste. The water was evaporated off on a hot plate until the catalyst was fairly dry and was giving off nitric acid fumes. The catalyst was then transferred to a Pyrex glass tube and was heated in a vertical furnace at 350° C. with a slow stream of nitrogen passing through until the exit nitrogen no longer gave an acid test. The catalyst was cooled, hydropressed to 4500 pounds per square inch and was screened to 8-12 mesh.

2,3-butylene glycol diacetate was passed over the catalyst at atmospheric pressure in a number of runs at varying temperatures to yield the data given in the following table:

| | | | | | | |
|---|---|---|---|---|---|---|
| Block temperature °C | 200 | 300 | 300 | 325 | 325 | 400 |
| Hourly liquid space velocity | 1.02 | 1.02 | 0.5 | 1.0 | 2.0 | 0.98 |
| Esters reacted percent | 1.3 | 47.5 | 66.1 | 64.2 | 47.8 | 29.7 |
| Butadiene obtained: | | | | | | |
|   Percent yield on esters charged | 0 | 34.2 | 50 | 32.6 | 32.9 | 8.4 |
|   Percent yield on esters reacted | 0 | 71.8 | 75.2 | 50.8 | 68.7 | 28.0 |
| Condensable gas, mol percent: | | | | | | |
|   Butadiene | ---- | 95.9 | 97 | 91.2 | 96.0 | 80.0 |
|   Butenes | ---- | ---- | 2.8 | 5.5 | 2.4 | ---- |
|   Carbon dioxide | ---- | ---- | 0.2 | 3.3 | 0.4 | ---- |

The above data show that the best results in regard to yield of butadiene and the selectivity of the decomposition reaction were obtained at a temperature of 300° C. and an hourly liquid space velocity of 0.5. Both yield and selectivity of the reaction fell off at 325° C. and the yield was reduced to an impractical point at 400° C. At 200° C. there was no yield of butadiene observed. By changing hourly liquid space velocity and other experimental conditions it is possible to obtain substantial amounts of butadiene when operating outside the temperature ranges indicated.

We claim as our invention:

1. A process for producing butadiene which comprises treating a butanediol di-alkanoate to produce said butadiene and an alkanoic acid in the presence of a catalyst prepared by compositing kieselguhr with a solution of copper orthophosphate in nitric acid and heating to vaporize water and said nitric acid.

2. A process for producing butadiene which comprises subjecting 2,3-butylene glycol diacetate at a temperature of from about 200° C. to about 550° C. to the action of a copper phosphate catalyst.

3. A process for producing butadiene which comprises subjecting 2,3-butylene glycol diacetate at a temperature of from about 200° C. to about 550° C. to the action of a solid catalyst comprising copper orthophosphate.

4. A process for producing butadiene which comprises subjecting 2,3-butylene glycol diacetate at a temperature of from about 200° C. to about 550° C. to the action of a solid catalyst comprising copper pyrophosphate.

5. A process for producing butadiene which comprises subjecting 2,3-butylene glycol diacetate at a temperature of from about 200° C. to about 550° C. to the action of a catalyst comprising a copper phosphate and kieselguhr.

HERMAN PINES.
VLADIMIR N. IPATIEFF.